United States Patent
Rovner et al.

(10) Patent No.: US 9,410,830 B2
(45) Date of Patent: Aug. 9, 2016

(54) MAGNETIC FLOWMETER FLOWTUBE ASSEMBLY WITH INTERCHANGEABLE LINER/ELECTRODE MODULE

(71) Applicant: Rosemount Inc., Chanhassen, MN (US)

(72) Inventors: Bruce D. Rovner, Minneapolis, MN (US); Steven B. Rogers, Minnetonka, MN (US)

(73) Assignee: MICRO MOTION, INC., Boulder, CO (US)

(*) Notice: Subject to any disclaimer, the term of this patent is extended or adjusted under 35 U.S.C. 154(b) by 24 days.

(21) Appl. No.: 14/319,332

(22) Filed: Jun. 30, 2014

(65) Prior Publication Data

US 2015/0377666 A1    Dec. 31, 2015

(51) Int. Cl.
*G01F 1/32* (2006.01)
*G01F 1/58* (2006.01)

(52) U.S. Cl.
CPC ............... *G01F 1/584* (2013.01); *G01F 1/586* (2013.01)

(58) Field of Classification Search
CPC ..................................... G01F 1/58; G01F 1/32
USPC ............................ 73/861.12, 861.15, 861.24
See application file for complete search history.

(56) References Cited

U.S. PATENT DOCUMENTS

| | | | |
|---|---|---|---|
| 4,065,965 A | 1/1978 | Ackerman et al. | |
| 5,458,005 A * | 10/1995 | Perelshteyn | G01F 1/3263 73/861.18 |
| 5,533,549 A * | 7/1996 | Sherman | F16K 27/067 137/556.6 |
| 5,750,902 A | 5/1998 | Schwiderski | |
| 7,926,361 B2 * | 4/2011 | Hoecker | G01F 1/3209 73/861.22 |
| 2013/0006544 A1 | 1/2013 | Rovner | |
| 2013/0061971 A1 | 3/2013 | Chamberland | |
| 2013/0305838 A1 | 11/2013 | Mikolichek et al. | |
| 2014/0090483 A1 | 4/2014 | Smith et al. | |

FOREIGN PATENT DOCUMENTS

JP        02-268231 A        11/1990

OTHER PUBLICATIONS

International Search Report and Written Opinion for International Applicaton No. PCT/US2015/037991, date of maillng: Sep. 24, 2015, date of filing: Jun. 26, 2015, 11 pages.

* cited by examiner

*Primary Examiner* — Jewel V Thompson
(74) *Attorney, Agent, or Firm* — Christopher R. Christenson; Kelly, Holt & Christenson, PLLC (57) ABSTRACT

A flowtube assembly for a magnetic flowmeter is provided. The flowtube assembly includes a tube extending from a first mounting flange to a second mounting flange. Each of the first and second mounting flanges has a pipe flange facing surface for mounting to a respective pipe flange. A coil chamber is disposed outside the tube, between the first and second mounting flanges. The coil chamber has at least one coil located inside that is configured to generate a magnetic field within the tube. A liner/electrode module is positioned within the tube and has a non-conductive liner, at least one electrode and at least one electrode conductor. The non-conductive liner extends from the first mounting flange to the second mounting flange. The at least one electrode is positioned in the non-conductive liner to interact with a conductive process fluid. The electrode conductor extends from the at least one electrode to an interconnect tab disposed adjacent the pipe facing flange surface of one of the first and second mounting flanges. The liner/electrode module is positionable within the tube.

22 Claims, 8 Drawing Sheets

MAGNETIC FLOWMETER FLOWTUBE ASSEMBLY WITH INTERCHANGEABLE LINER/ELECTRODE MODULE

BACKGROUND

Magnetic flowmeters (or mag meters) measure flow by Faraday induction, an electromagnetic effect. The magnetic flowmeter energizes a coil which generates a magnetic field across a section of a flowtube assembly. The magnetic field induces an electromotive force (EMF) across the flow of conductive process fluid. The resulting potential developed across the conductive fluid is measured using a pair of electrodes that extends into the flowing process fluid. Alternatively, some magnetic flowmeters employ capacitive coupling between the electrodes and the process fluid such that the EMF can be measured without direct contact. In any event, the flow velocity is generally proportional to the induced EMF, and the volumetric flow is proportional to the flow velocity and the cross sectional area of the flowtube.

Magnetic flowmeters are useful in a variety of fluid flow measurement environments. In particular, the flow of water-based fluids, ionic solutions and other conducting fluids can all be measured using magnetic flowmeters. Thus, magnetic flowmeters can be found in water treatment facilities, beverage and hygienic food production, chemical processing, high purity pharmaceutical manufacturing, as well as hazardous and corrosive fluid processing facilities. Magnetic flow meters are often employed in the hydrocarbon fuel industry, which sometimes employ hydraulic fracturing techniques utilizing abrasive and corrosive slurries.

Magnetic flowmeters provide fast, accurate flow measurements in applications where differential pressure-based techniques may be disfavored due to the associated pressure drop across an orifice plate or Venturi tube. In contrast, magnetic flowmeters can be used when it is difficult to introduce a mechanical element into the process fluid flow. Accordingly, a significant proportion of the applications to which magnetic flowmeters are applied involve abrasive and/or corrosive process fluid. When magnetic flowmeters are used in such abrasive applications, the process fluid can wear both the liner and electrodes within the flowtube, which may eventually render the entire magnetic flowmeter inoperable. Historically, the solution to this problem was to replace the flowtube assembly. Providing a magnetic flowmeter flowtube assembly that could be more easily repaired in the field when such wear occurs, for less cost, would advance the art of process fluid flow measurement for such abrasive and/or corrosive applications.

SUMMARY

A flowtube assembly for a magnetic flowmeter is provided. The flowtube assembly includes a tube extending from a first mounting flange to a second mounting flange. Each of the first and second mounting flanges has a pipe flange facing surface for mounting to a respective pipe flange. A coil chamber is disposed outside the tube, between the first and second mounting flanges. The coil chamber has at least one coil located inside that is configured to generate a magnetic field within the tube. A liner/electrode module is positioned within the tube and has a non-conductive liner, at least one electrode and at least one electrode conductor. The non-conductive liner extends from the first mounting flange to the second mounting flange. The at least one electrode is positioned in the non-conductive liner to interact with a conductive process fluid. The electrode conductor extends from the at least one electrode to an interconnect tab disposed adjacent the pipe facing flange surface of one of the first and second mounting flanges. The liner/electrode module is positionable within the tube.

DETAILED DESCRIPTION OF ILLUSTRATIVE EMBODIMENTS

Magnetic flowmeters are often used in tough or demanding applications where the process fluid is abrasive and/or corrosive toward the liner and electrodes of the flowtube assembly. Additionally, traditional magnetic flowtube assemblies are generally manufactured with a hole through a sidewall of the flowtube and the liner where the electrode makes contact with the process fluid. Leaks through the liner/electrode module into the electrical housings are usually catastrophic to the entire magnetic flowmeter. Maintenance of such flowtube assemblies can be difficult in that both the power and the signal connections must be removed and the entire magnetic flowmeter must be pulled out of the process pipe. In applications where coated electrodes become a problem, the liner of the flowtube must be cleaned. Often, cleaning the liner of the flowtube is only achievable by removing the entire flowtube from the process fluid line. Another common failure mode is permeation of the liner. Vapors, such as water, can permeate the liner and build pressure between the liner and the steel pipe. If the pressure in the space between the pipe and the liner exceeds the pressure inside the liner, the liner may collapse inwardly.

For magnetic flowmeters that are used with abrasive applications, such as mining slurries, the flowtube assembly must generally be replaced fairly frequently, often every 6-18 months. This typically requires completely removing the entire flowtube assembly from the pipeline, as well as rewiring the magnetic flowmeter. Frequent replacement is a significant cost to the user not simply in terms of the purchase price of the flowmeter, but also in terms of labor and down time. For example, for a magnetic flowmeter with a line size of approximately 24 inches (diameter) the cost of the complete flowtube assembly can be thousands of dollars. However, the components that are subject to wear from the abrasive process fluid typically comprise only a small fraction (such as 5%) of the total cost of the flowtube assembly. This is because the cost of the flowtube assembly is substantially driven by the pipe, the metal flange, the coils and the housing. These components are typically not subject to wear from the abrasive process fluid. Moreover, these non-wearing parts can comprise anywhere from 80-95% of the cost of the flowtube assembly.

Embodiments of the present invention generally facilitate the reuse of the non-wearing parts thereby substantially reducing the costs required to repair a flowmeter that has a worn-out liner. Instead, the wearing parts (liner/electrode module) can simply be removed from the non-wearing components of the flowtube assembly. In this way, the cost of operating a magnetic flowmeter for abrasive process fluids is substantially reduced.

Figure 1:
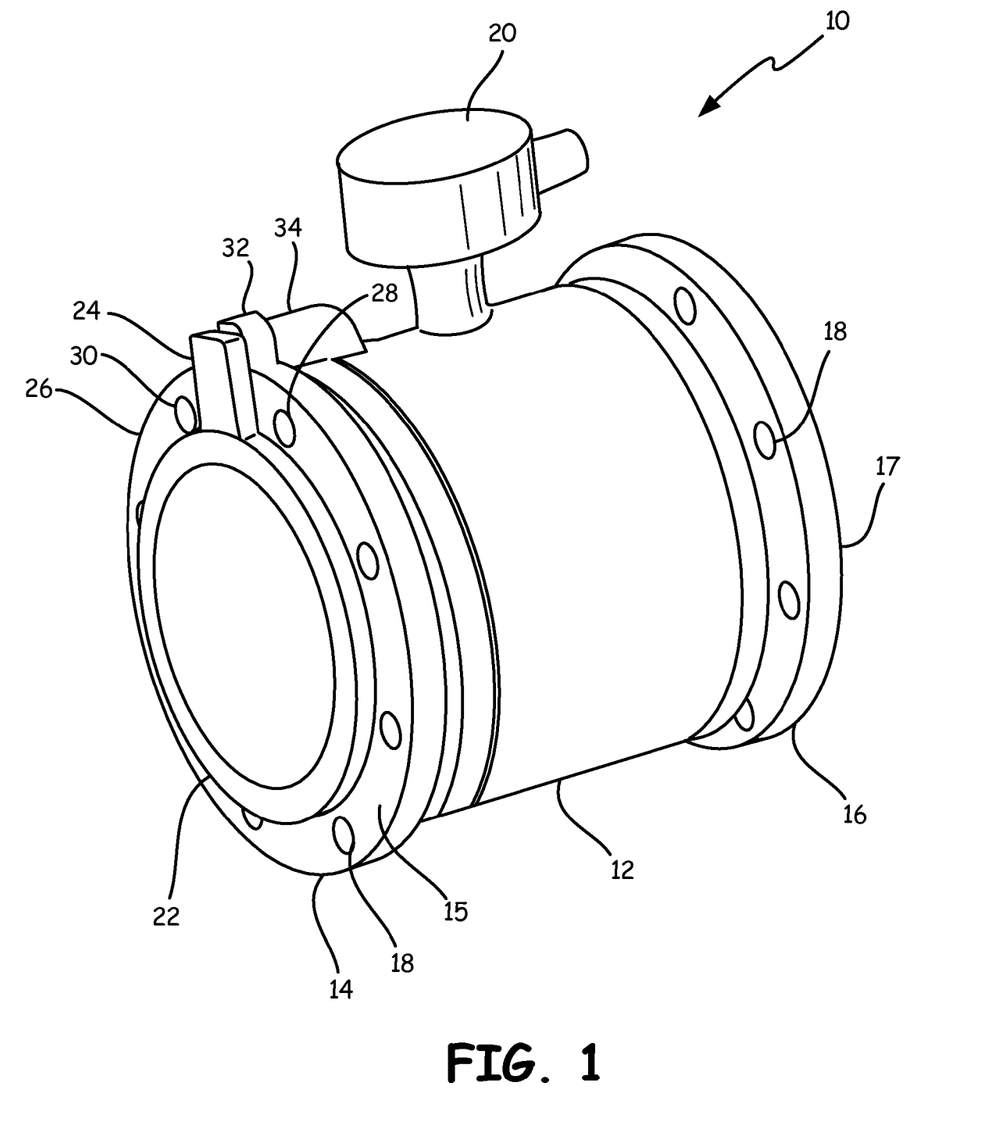
FIG. 1 is a diagrammatic perspective view of a magnetic flowmeter flowtube assembly in accordance with an embodiment of the present invention.

FIG. 1 is a diagrammatic perspective view of a magnetic flowmeter flowtube assembly in accordance with an embodiment of the present invention. Magnetic flowmeter flowtube assembly 10 includes a flowtube 12 extending between a pair of pipe flanges 14, 16. In some embodiments, flowtube 12 is constructed entirely from metal. Each of pipe flanges 14, 16 includes a respective pipe facing surface 15, 17 that faces a respective pipe (not shown). Each of mounting flanges 14, 16 also includes a plurality of mounting holes 18 therethrough which allow mounting flanges 14, 16 to be mounted between sections of piping. Magnetic flowmeter flowtube assembly 10 also includes electronics housing 20 which contains a terminal board 36 (shown in FIG. 2) that allows a connection between transmitter electronics (not shown) and coils/electrodes within flowtube assembly 10. Flowtube assembly 10, in accordance with an embodiment of the present invention, includes liner/electrode module 22 which extends axially beyond face 15 and radially outwardly therefrom. Accordingly, as flange 14 is drawn to its corresponding pipe flange, liner/electrode module 22 is sandwiched therebetween. As illustrated in FIG. 1, liner/electrode module 22 includes at least one interconnect tab 24 that extends radially outwardly beyond the outer diameter 26 of mounting flange 14 between mounting holes 28, 30. Electrical connectors (not shown in FIG. 1) on interconnect tab 24 couple with mating connectors proximate flange tab 32 which allows an electrical connection through conduit 34 to housing 20. This is particularly advantageous in that no electrical connections of the electrodes or any other components within the liner/electrode module 22 (such as any additional temperature, pressure or capacitance sensors) require electrical interconnection radially through the flowtube itself. Instead, all electrical interconnects are routed through the space between face 15 and the opposing face of the pipe flange. This eliminates the potential for leaks to occur through radial apertures in the flowtube wall. In some embodiments, an interconnecting ribbon may be molded or laminated into liner/electrode module 22 such that facilitate an effective seal.

Figure 2:
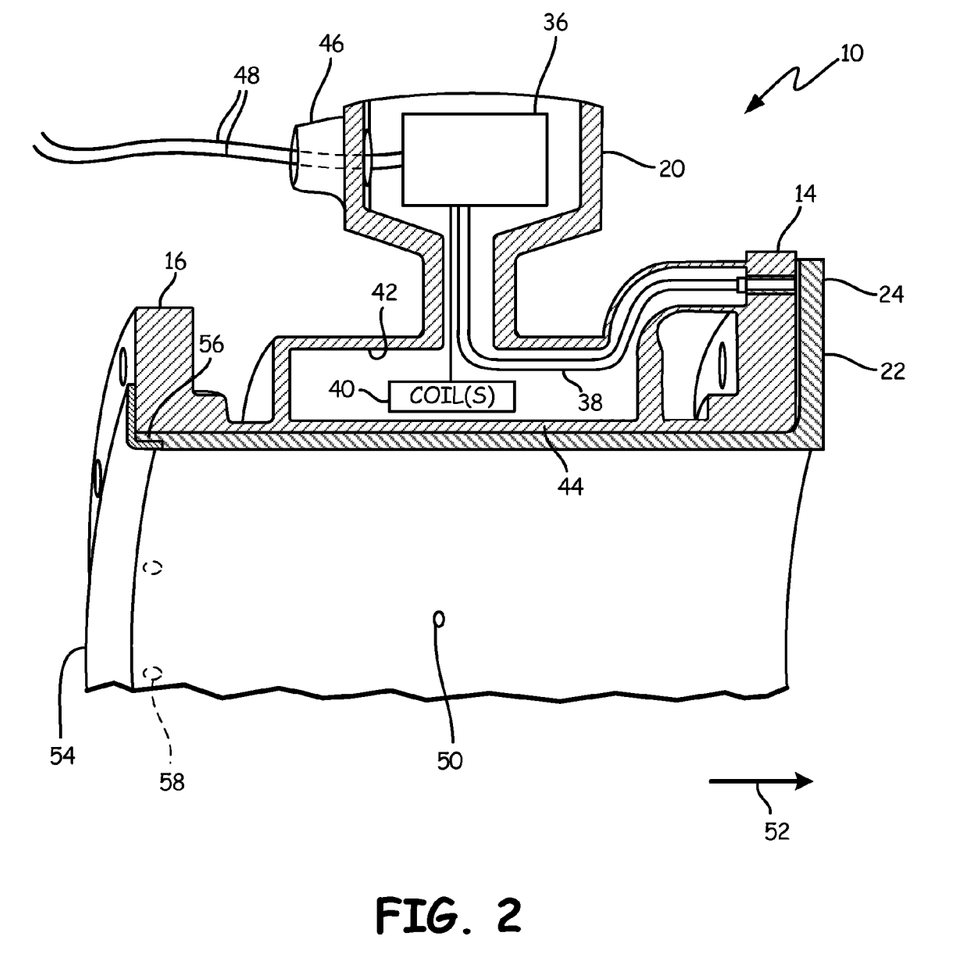
FIG. 2 is a partial cross-sectional diagram of a magnetic flowmeter flowtube assembly in accordance with an embodiment of the present invention.

FIG. 2 is a diagrammatic cross-sectional view of a portion of a magnetic flowmeter flowtube assembly in accordance with an embodiment of the present invention. As shown in FIG. 2, terminal block 36 is disposed within housing 20 and is electrically coupled to liner/electrode module 22 via conductors 38. Additionally, terminal block 36 is also coupled to one or more electromagnetic coils 40 disposed within chamber 42 proximate tube wall 44. Terminal block 36 facilitates electrical connection between magnetic coils 40 and suitable coil driver circuitry (not shown) to cause coils 40 to generate a magnetic field across the process fluid flowing through the flowtube assembly. Terminal block 36 is located proximate conduit 46 and allows conductors 48 to readily connect to suitable magnetic flowmeter electronics. The combination of a magnetic flowmeter flowtube assembly with suitable magnetic flowmeter electronics provides a functioning magnetic flowmeter.

FIG. 2 shows one of the plurality of electrodes which contacts process fluid flowing through liner/electrode module 22. An electrical interconnection between electrode 50 and conductors 38 occurs via interconnect tab 24. Liner/electrode module 22 may be fabricated as a laminated layer structure or a liner may be molded over electrode 50 and wiring traces or conductors. In either case, liner/electrode module 22 is connected via pins, or other suitable structures, at interconnect tab 24 to the coil/housing module to form a complete magnetic flowmeter flowtube assembly. In one embodiment, interconnect tab 24 includes pins which are received in suitable sockets when interconnect tab 24 is suitably connected to flange mount tab 32. Thus, since the electrical interconnect between electrode 50 and conductors 38 occurs through interconnect tab 24, there is no aperture through pipe wall 44. Accordingly, tube wall 44 is substantially continuous from mounting flange 14 to mounting flange 16 across its entire inside surface. In comparison to prior techniques, this eliminates at least two apertures through tube wall 44 and accordingly two potential leak points. When liner/electrode module 22 requires replacement, such replacement can be done simply by removing the flowmeter from the pipe section and sliding the liner/electrode module from the coil/housing module. In the embodiment illustrated in FIG. 2, this sliding would occur in the direction indicated by arrow 52. Then, a new liner/electrode module would simply be slid back into position and the magnetic flowmeter could be returned to service. It is believed that the time required for such an operation would be substantially reduced compared to pulling the entire magnetic flowmeter from the process line. Thus, a new liner/electrode module can be slid into place and new calibration information can be entered into the magnetic flowmeter electronics.

FIG. 2 also indicates an integrated lining protector 54 that essentially captures the "free" end 56 of liner/electrode module 22. Lining protector 54, in one embodiment, is welded to mounting flange 16, to generate a robust physical connection and seal. However, in another embodiment, lining protector 54 may be replaceable. By capturing end 56, lining protector 54 protects end 56 from abrasion. Additionally, in at least some embodiments, end 56 of the liner may include a plurality of apertures or perforations 58 which would help facilitate pressure equalization such that vacuum, extreme low pressure applications or pressure buildup behind the liner due to permeation would not cause the liner to collapse.

Figure 3:
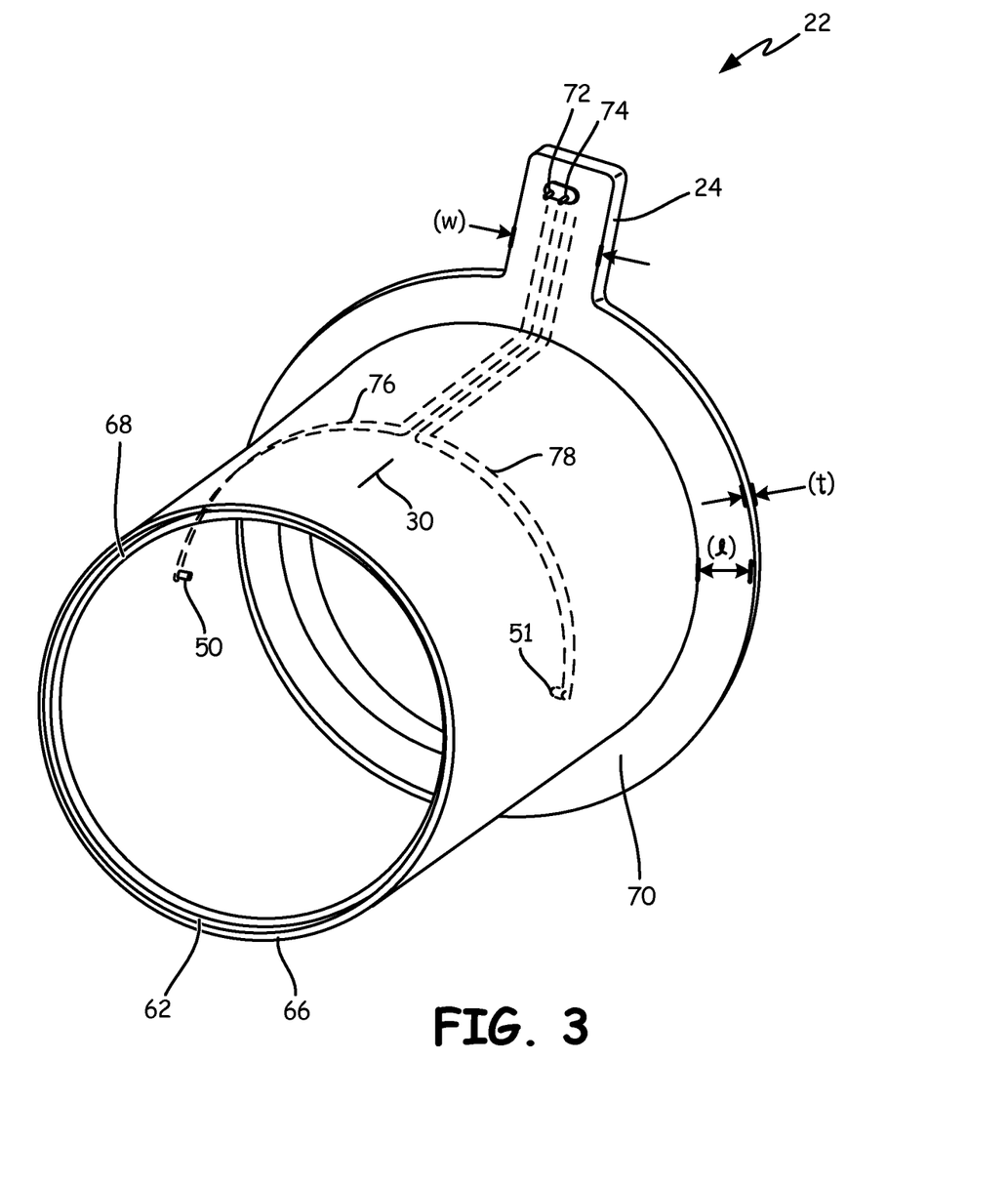
FIG. 3 is a diagrammatic perspective view of a liner/electrode module of a magnetic flowmeter flowtube assembly in accordance with an embodiment of the present invention.

FIG. 3 is a diagrammatic perspective view of liner/electrode module 22 in accordance with an embodiment of the present invention. Liner/electrode module 22 includes a liner portion 60 having a first end 62 and a second end 64, which ends 62, 64 are generally positioned proximate respective mounting flanges. In one embodiment, end 62 generally has an outside diameter 66 that is sized to slide within the inside diameter of tube wall 44 (shown in FIG. 2). However, embodiments of the present invention can be practiced where liner/electrode module 22 is deformed slightly to allow it to pass within the inside diameter of tube wall 44. Further, any suitable techniques can be used for inserting or otherwise positioning liner/electrode module 22 within tube wall 44. In one embodiment, end 62 also includes a step or shoulder 68 that is sized and shaped to receive lining protector 54 (shown in FIG. 2). End 64 generally includes a lip 70 that generally extends radially from outside diameter 66. However, the length (l) of the extension is selected such that lip 70 does not interfere or otherwise obstruct any of the mounting holes. Lip 70 also includes a thickness (t) that is sufficient to pass and protect conductors through interconnect tab 24. This is important because when all of the mounting hardware is installed in the various mounting holes 18, the clamping force on lip 70 and interconnect tab 24 can be substantial. Interconnect tab 24 also has a width (w) that is less than the distance between adjacent mounting holes 18 such that tab 24 will not obstruct any of mounting holes 28 or 30. FIG. 3 illustrates one of electrodes 50 extending radially inwardly from the liner. An electrical interconnection between electrode 50 and pin 72 is provided by a wire or trace that is encapsulated or otherwise disposed within liner/electrode module 22 to convey signals between electrode 50 and pin 72. Similarly, a second electrode 51 (shown in FIG. 4) is disposed opposite electrode 50 and electrically connected to pin 74. Pins 72, 74 are received by respective sockets in flange mount tab 32 in order to electrically connect the electrodes to the terminal board 36. Those skilled in the art will also recognize that additional sensors or electronic structures may be embedded within liner/electrode module 22 and electrically coupled to terminal board 36 by additional pins/sockets as deemed appropriate. For example, an additional temperature, pressure, pH, or other suitable sensor could be embedded within liner/electrode module 22 and electrically coupled to terminal board 36. Additionally, a sensor having an electrical characteristic, such as resistance or capacitance, which changes with the amount of wear that the liner/electrode module has experienced, is particularly useful.

The lining material of liner/electrode module 22 can be any suitable lining material for magnetic flowmeter linings. Examples of suitable lining material include polytetrafluoroethylene (PTFE); ethylene tetrafluoroethylene (ETFE); PFA; polyurethane; neoprene; and linatex rubber. Given that the liner/electrode module will be inserted axially along the inside diameter of tube wall 44, is important for one of ends 62, 64 to be slidable or otherwise positionable within the flowtube itself. In embodiments where the liner is deformable, it is contemplated that the deformation of one of the ends may facilitate positioning the liner within the flowtube assembly FIG. 3 illustrates liner/electrode module 22 having both electrodes 50, 51 as well as the respective electrical interconnects 76, 78 to pins 72, 74. In the embodiment shown in FIG. 3, the routing of interconnects 76, 78 is from each respective electrode along a diameter of the liner until they are proximate each other, then extend longitudinally substantially parallel to one another to the interconnect tab. In the embodiment shown in FIG. 3, interconnects 76, 78 extend longitudinally to interconnect tab 24 proximate top center 80 of liner/electrode module 22. It is believed that this will minimize inductive coupling from the coil to electrode circuits resulting in improved performance.

The selection of liner material is generally driven by the knowledge of process fluid that will be measured. For example, some process fluids may be particularly aggressive or caustic with respect to a specific lining material, but otherwise not affect a second lining material. Embodiments of the present invention generally allow the user thereof to remove lining/electrode modules and try different materials to obtain better results without the necessity of swapping out entire flowtube assemblies.

The interconnects 76, 78 are generally ribbons or wires that may be laminated within the liner such that a seal is maintained by either or both of the following methods: (a) bonding the liner to the metal ribbon or (b) compressing the metal ribbon between layers of the liner and the flange face.

Figure 4:
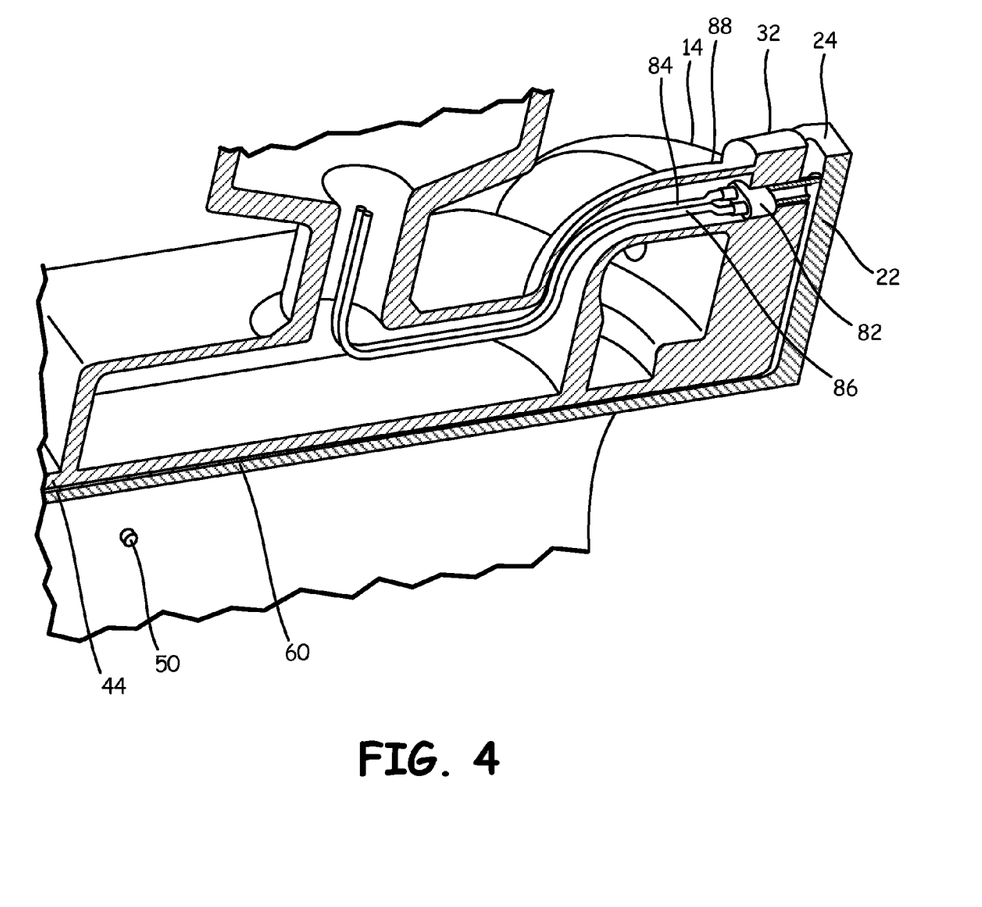
FIG. 4 is a diagrammatic cross-sectional view of portion of a magnetic flowmeter flowtube assembly in accordance with an embodiment of the present invention.

FIG. 4 is a diagrammatic perspective cross-sectional view of a portion of a magnetic flow meter flowtube assembly in accordance with an embodiment of the present invention. In particular, FIG. 4 shows liner portion 60 of liner/electrode module 22 extending within and proximate tube wall 44. Additionally, FIG. 4 shows electrode 50 extending radially inwardly. Of particular note in FIG. 4, flange 14 includes flange mount tab 32 which supports connector 82. Connector 82 has a plurality of sockets that accept and couple to pins 72, 74. Additionally, the sockets within connector 82 are coupled to conductors 84, 86 which extend through metal conduit 88 to housing 20. When magnetic flowmeter flowtube assembly 10 is mounted between a pair of pipe flanges, the clamping pressure of the pipe flange ensures that the liner/electrode module 22 is held firmly in position.

Figure 5:
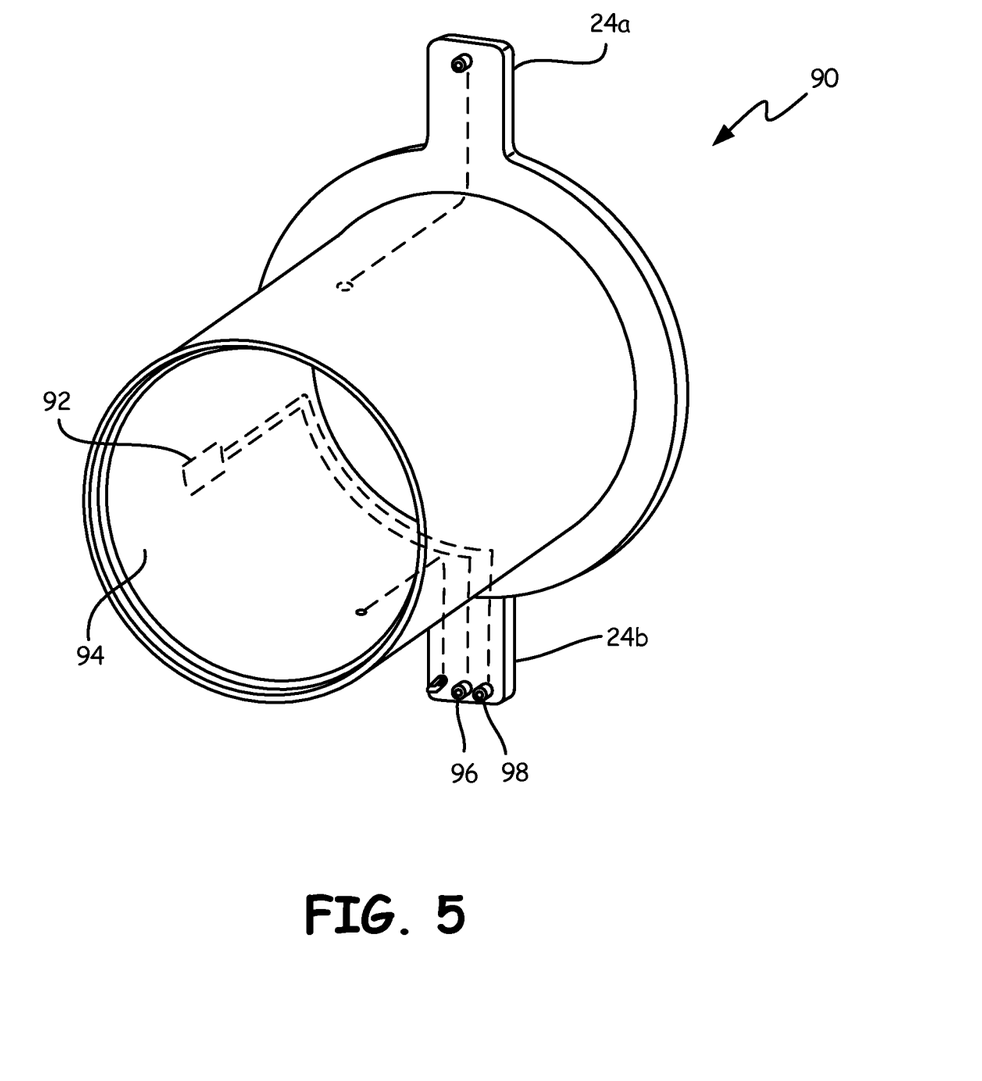
FIG. 5 is a diagrammatic perspective view of a liner/electrode module of a magnetic flowmeter flowtube assembly in accordance with another embodiment of the present invention.

FIG. 5 is a diagrammatic perspective view of a liner/electrode module 90 of a magnetic flowmeter flowtube assembly in accordance with another embodiment of the present invention. Unlike liner/electrode module 22 (shown in FIG. 3), liner/electrode module 90 has a pair of interconnect tabs 24a, 24b. Each interconnect tab 24a, 24b supports one or more electrical connectors, such as pins, that couple to corresponding connectors mounted relative to flanges 14, 16. The utilization of a plurality of interconnect tabs increases the positional precision of the liner/electrode module when the module is mounted to the flowtube/coil module. Additionally, utilizing additional interconnect tabs provides additional area for connectors of one or more auxiliary sensors, such as temperature, pressure, pH, magnetic flux density, wear or other suitable sensors employed within or proximate the liner/electrode module. In the embodiment illustrated in FIG. 5, a wear sensor 92 is embedded within liner 94. Conductors within liner 94 couple wear sensor 92 to respective pins 96, 98, which are received by corresponding sockets that ultimately couple wear sensor 92 to a terminal board, such as terminal board 36, shown in FIG. 2. While a single wear sensor 92 is shown, embodiments of the present invention include variations in quantity and type(s) of sensors that can be employed within or proximate the flowtube and coupled to a terminal block. In one embodiment, wear sensor 92 can simply include a conducting layer of material embedded within the non-conductive liner. When sufficient wear through the non-conductive liner exposes the conductive material of wear sensor 92 to the conductive process fluid, a resistance between either of the electrodes and the wear sensor 92 will indicate contact with the conductive process fluid.

Figure 6:
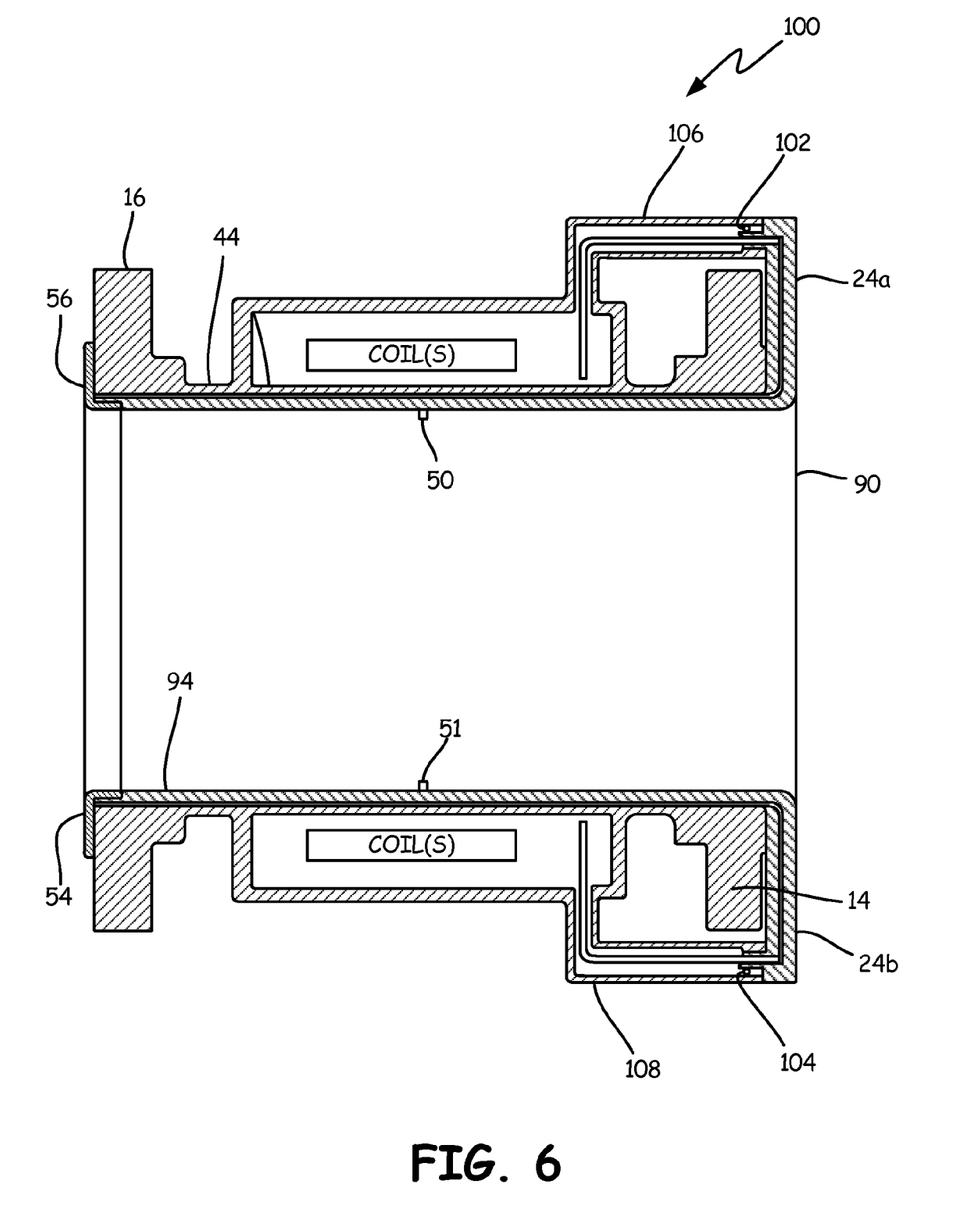
FIG. 6 is a diagrammatic perspective view of a magnetic flowmeter flowtube assembly in accordance with another embodiment of the present invention.

FIG. 6 is a diagrammatic perspective view of a magnetic flowmeter flowtube assembly in accordance with another embodiment of the present invention. Flowtube assembly 100 bears some similarities to flowtube assembly 10 (shown in FIGS. 1 and 2) and like components are numbered similarly. Liner/electrode module 90 extends within tube wall 44 with end 56 being captured by lining protector 54. Liner/electrode module 90 includes a plurality of interconnect tabs 24a, 24b that couple to respective connectors 102, 104 mounted relative to flange 14. The conductors coupled to connectors 102, 104 travel to coil chamber 42 via respective conduits 106, 108. One or more coils 40 are disposed within coil chamber 42 and generate a magnetic field across process fluid flowing through flowtube assembly 100. Electrodes 50, 51 are exposed at an inside diameter of liner 94 and directly contact process fluid flowing therein. However, neither electrodes 50, 51, nor conductors coupled thereto, pass through tube wall 44. Instead, conductors extend from each of electrodes 50, 51 to suitable pins on an interconnect tab, 24a, 24b. In this way, there is no aperture or bore through tube wall 44. Additionally, since the number of interconnect tabs can be any suitable number ranging from 1 to the number of spaces between adjacent flange mounting holes, a wide variety of interconnects can support an array of sensors positioned within or proximate liner 94.

As set forth above, the liner and electrode module are separate from the pipe and coil module. Accordingly, there can be dimensional variability when a liner/electrode module is replaced. This dimensional variation will affect the position of the electrodes relative to the magnetic field. Thus, the signal from the electrode could be affected resulting in error. In order to reduce the variability that may occur due to small differences in the location of the magnetic coils with respect to the electrodes, some embodiments of the present invention employ a magnetic "spreader" disposed within or proximate the liner. The magnetic spreader distributes the magnetic field evenly through the process fluid. As used herein, a magnetic "spreader" is any magnetic permeable member that is embedded within the liner.

Figure 7:
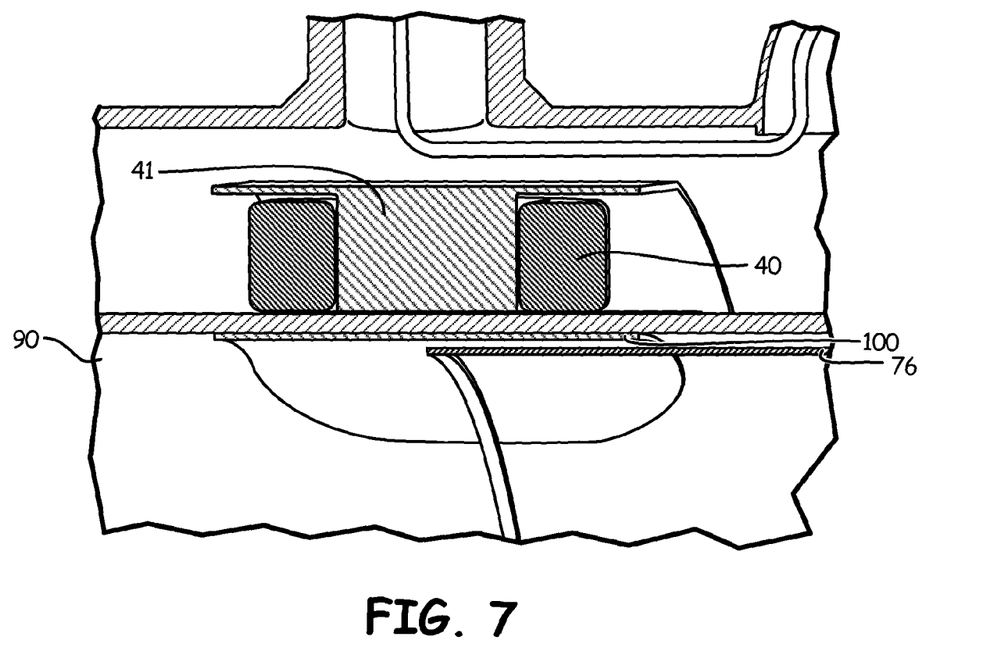
FIG. 7 is a diagrammatic cross-sectional view of a portion of a magnetic flowmeter flowtube assembly with a magnetic spreader in accordance with an embodiment of the present invention.

FIG. 7 is a cross sectional view of a magnetic flowmeter flowtube assembly employing a magnetic spreader in accordance with an embodiment of the present invention. Spreader 100 is embedded within liner/electrode module 90 between interconnects 76, 78 and coil 40. Coil 40 is disposed about magnetic permeable core 41 from which most of the magnetic field lines emanate. Magnetic permeable core 41 can be formed of any suitable magnetic permeable material. As illustrated, spreader 100 is similar in thickness to interconnect 76 and follows the contour of the curved surface of the inner diameter of the pipe. Spreader 100, in one embodiment, is sized to overlap the outer periphery of coil 40. In this way, small variations in the positioning of liner/electrode module 90 will be insufficient to move spreader 100 beyond the periphery of coil 40. Thus, the field lines emanating from coil 40 and magnetic permeable core 41 will still pass through spreader 100. Spreader 100 distributes the magnetic field evenly through the process fluid.

Figure 8:
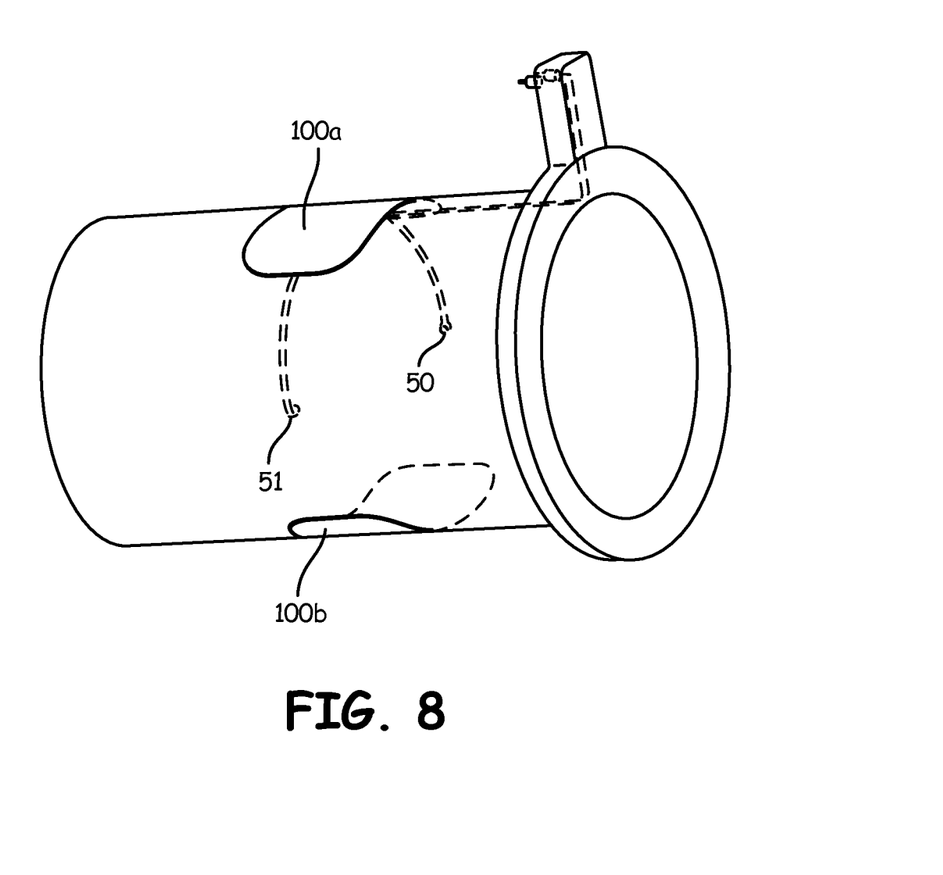
FIG. 8 is a diagrammatic perspective view of a liner/electrode module having an embedded magnetic spreader in accordance with an embodiment of the present invention.

FIG. 8 is a diagrammatic perspective view of a liner/electrode assembly having an embedded magnetic spreader in accordance with an embodiment of the present invention. Liner/electrode module 90 has a pair of magnetic spreaders 100a, 100b diametrically opposite one another. Additionally, as shown in FIG. 8, spreaders 100a, 100b are positioned at an approximate 90 degree offset from diametrically opposed electrodes 50, 51. However, since spreaders 100a, 100b are fixed in relation to electrodes 50, 51, the magnetic field distribution will be essentially identical, regardless of small variations in location of the coils and magnetic cores.

Embodiments of the present invention generally provide a number of advantages over prior techniques and structures. When users are unsure which liner material is best for a specific corrosive or abrasive application, embodiments of the present invention would generally make changing the liner material, the electrode material, or the electrode style much cheaper and easier.

Historically, when a liner of a magnetic flowmeter required repair, the repair would require the services of both a skilled pipefitter for the plumbing and a skilled electrician for the wiring. It is believed that employing embodiments of the present invention will allow a skilled pipefitter to replace the liner/electrode assembly without requiring the services of an electrician. This should further reduce downtime.

Although the present invention has been described with reference to preferred embodiments, workers skilled in the art will recognize that changes may be made in form and detail without departing from the spirit and scope of the invention.

What is claimed is:

1. A flowtube assembly for a magnetic flowmeter, the flowtube assembly comprising:
    a tube extending from a first mounting flange to a second mounting flange, each of the first and second mounting flanges having pipe flange facing surfaces for mounting to respective pipe flanges;
    a coil chamber disposed outside the tube, between the first and second mounting flanges, the coil chamber having at least one coil disposed therein and being configured to generate a magnetic field within the tube; and
    a liner/electrode module positioned within the tube, the liner/electrode module having:
        a non-conductive liner extending from the first mounting flange to the second mounting flange;
        at least one electrode disposed in the non-conductive liner to interact with a conductive process fluid;
        an electrode conductor extending from the at least one electrode to an interconnect tab disposed adjacent the pipe facing flange surface of one of the first and second mounting flanges; and
    wherein the liner/electrode module is positionable within the tube.

2. The flowtube assembly of claim 1, and further comprising a housing coupled to the coil chamber, and wherein the housing includes at least one coil conductor, coupled to the at least one coil, and the electrode conductor.

3. The flowtube assembly of claim 2, and further comprising a terminal block disposed in the housing and coupled to the at least one coil conductor and the electrode conductor.

4. The flowtube assembly of claim 1, wherein the at least one electrode comprises a plurality of electrodes disposed on opposite sides of the flowtube from one another.

5. The flowtube assembly of claim 4, wherein a conductor is coupled to each electrode, and wherein the electrode conductors are routed at least partially along a top of the flowtube.

6. The flowtube assembly of claim 4, and further comprising a second interconnect tab disposed adjacent the pipe facing flange of one of the first and second mounting flanges.

7. The flowtube assembly of claim 1, and further comprising a sensor mounted relative to the liner, the sensor having a pair of sensor conductors that pass within the interconnect tab.

8. The flowtube assembly of claim 1, wherein the liner/electrode module is slidable within the tube.

9. The flowtube assembly of claim 1, wherein the tube is a metal tube.

10. A liner/electrode module for a flowtube of a magnetic flowmeter, the assembly comprising:
    a cylindrical liner having a first end and a second end, the first end being configured to slide within an inside diameter of a flowtube and the second end having a lip extending radially outwardly;
    a pair of electrodes extending inwardly from an inside surface of the cylindrical liner, each electrode being coupled to a respective conductor that extends within the liner to at least one interconnect tab located on the lip.

11. The liner/electrode module of claim 10, wherein the respective conductor from each respective electrode extends along a diameter of the liner until the conductors are proximate each other, then extend longitudinally substantially parallel to one another to the interconnect tab.

12. The liner/electrode module of claim 10, wherein each respective conductor is coupled to a respective pin in a connector located at the interconnect tab.

13. The liner/electrode module of claim 10, wherein each respective pin extends longitudinally.

14. The liner/electrode module of claim 10, and further comprising at least one sensor embedded within the liner, the at least one sensor having a plurality of conductors operably coupled to respective pins of the interconnect tab.

15. The liner electrode module of claim 14, wherein the sensor is selected from the types consisting of temperature sensor, pressure sensor, wear sensor, magnetic flux density and pH sensor.

16. The liner/electrode module of claim 10, wherein the liner is constructed from a material selected from the group consisting of polytetrafluoroethylene (PTFE), ethylene tetrafluoroethylene (ETFE), PFA, polyurethane, neoprene, and linatex rubber.

17. The liner/electrode module of claim 10, wherein the first end includes a shoulder configured to be engaged by a lining protector.

18. The liner/electrode module of claim 10, wherein the first end includes a plurality of apertures extending radially therethrough.

19. The liner/electrode module of claim 10, wherein the tab location and its interface to a coil and tube module ensure that the electrodes are oriented perpendicular to a primary axis of the magnetic field of the coil.

20. The liner/electrode module of claim 10, and further comprising at least one magnetic spreader embedded within the liner and disposed to distribute magnetic field passing therethrough.

21. A method of forming a flowtube assembly for a magnetic flowmeter, the method comprising:
providing a tube/coil housing module including a coil chamber disposed about a flowtube having a substantially continuous internal diameter, the coil chamber containing at least one coil therein;
providing a liner/electrode module having a pair of electrodes disposed therein;
sliding the liner/electrode module into the flowtube until a lip of the liner/electrode module contacts a mounting flange of the tube/coil housing module; and
engaging cooperative connectors on the tube/coil housing module and the liner/electrode module to route all electrical connections of the liner/electrode module through at least one interconnect tab disposed proximate the mounting flange.

22. The method of claim 21, and further comprising capturing and end of the liner/electrode module with a lining protector.

* * * * *